Sept. 5, 1967   J. A. McGURTY ET AL   3,339,631
HEAT EXCHANGER UTILIZING VORTEX FLOW
Filed July 13, 1966                                   2 Sheets-Sheet 1

INVENTORS.
James A. McGurty
William C. Necker

ATTORNEY.

United States Patent Office 3,339,631
Patented Sept. 5, 1967

3,339,631
HEAT EXCHANGER UTILIZING VORTEX FLOW
James A. McGurty and William C. Necker, Cincinnati, Ohio, assignors to the United States of America as represented by the United States Atomic Energy Commission
Filed July 13, 1966, Ser. No. 565,009
3 Claims. (Cl. 165—109)

ABSTRACT OF THE DISCLOSURE

A steam generating heat exchange tube is provided with a central core comprising a tapered elongated shank of circular cross section and a helical rib integrally fixed to and encircling the shank. The helical rib, shank, and inside wall of the heat exchange tube define a spiralling flow path for steam generated in the heat exchange tube. Steam generated in the tube travels at high velocities along the inside of the spiralling flow path closest to the shank portion, and in doing so drives the unevaporated water in a spiral or vortex flow against the inside wall of the heat exchange tube with a resultant increase in the burnout heat flux of the tube.

---

Figure 1:
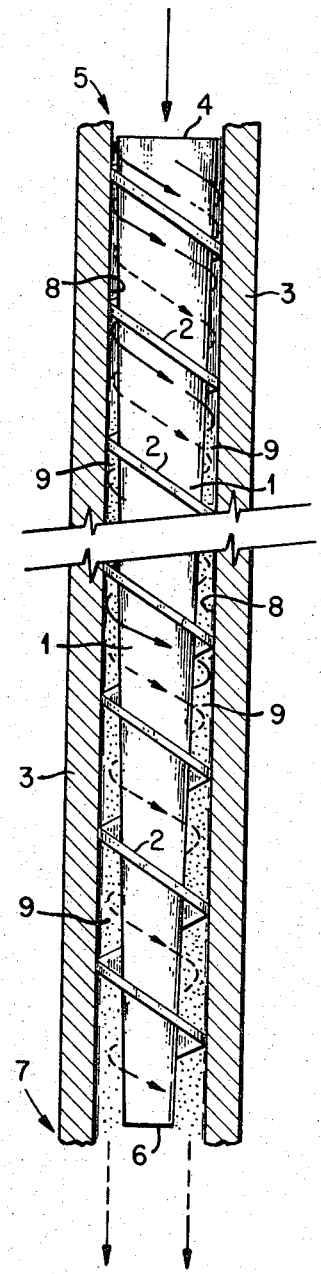

The invention described herein was made in the course of, or under a contract with the U.S. Atomic Energy Commission. It relates generally to heat transfer under nucleate boiling conditions, and more specifically to a vortex flow method and apparatus for increasing the burnout heat flux in a steam generating heat exchange passageway.

A long-existing problem associated with boiling-water neutronic reactor systems has been that of achieving high power densities in the reactor core without encountering "burnout" conditions. Burnout occurs in a boiling-water reactor when a maximum heat flux (burnout heat flux) is exceeded under nucleate boiling conditions and the density of the vapor bubbles being generated becomes so great that they coalesce and form a vapor film over the heat transfer surface. When this happens, film boiling occurs with a resultant sharp drop in the heat transfer rate between the heat transfer surface and the boiling water. Since reactor fuel elements provide a constant energy output, their operation under film boiling conditions, with reduced heat transfer, results in a great increase in their operating temperature. This increase in temperature generally results in a melting or burnout of the heat transfer surface or fuel element cladding which presents an extreme safety hazard in a neutronic reactor. A more detailed discussion of heat transfer to boiling liquids and the "burnout" problem can be found on pages 379–387 of Nuclear Reactor Engineering by Glasstone and Sesonske, 1963 edition.

The burnout problem, as discussed above, has provided a barrier to the utilization of the otherwise virtually unlimited power generating capacity of boiling water reactors. To increase the power output from such reactors, it is necessary to increase their burnout heat fluxes inasmuch as only a limited amount of heat transfer surface is available therein.

Although it is well known that burnout heat flux can be increased by increasing the axial rate of fluid flow past the heat transfer surface so as to shear the vapor bubbles from the heat transfer surface, this technique is severely limited because the pumping power required to increase the flow rate increases exponentially with the increase in burnout heat flux achieved thereby. Furthermore, such increases in burnout heat flux have generally been restricted to non-boiling or surface boiling systems where no useful steam is produced. It is also well known that an improvement in burnout heat flux results when spinning flow is provided. Spinning flow not only acts to shear vapor bubbles from the heat transfer surface as in axial flow but has the additional advantage of increasing the rate of vapor transfer away from the heat transfer surface due to the pressure gradient in the liquid coolant which results from the centrifugal action of the spinning flow. As shown in U.S. Patent No. 2,950,604 of common assignee, practical improvements over axial flow at equal pumping powers have been found where rotational velocities are achieved sufficient to produce centrifugal acceleration of the coolant water at the heat transfer surface of at least 10,000 $g$. The teachings of that patent also relate to nonboiling or surface boiling systems where no useful steam is produced; and although some improvements are noted at high rotational velocities over axial flow systems using equal pumping powers, exponential increases in pumping power with increasing burnout heat fluxes are also encountered as in the axial flow cases.

It is, accordingly, a general object of the invention to provide a method and apparatus for increasing the burnout heat flux in a steam generating channel.

Another object of the invention is to provide a method and apparatus for increasing the burnout heat flux in a steam generating channel characterized by low pressure drops through the channel.

Another object of the invention is to provide a method and apparatus for causing vortex coolant flow within a gas-generating channel wherein the gaseous phase of the coolant drives the liquid phase in vortex flow against the channel wall.

Still another object of the invention is to provide a method and apparatus for increasing the burnout heat flux in a steam generating channel wherein a portion of the heat transferred from the walls of the channel is converted into kinetic energy of the unevaporated water coolant causing the unevaporated coolant to follow a spiral flow path, and thereby creating large centrifugal forces in the liquid coolant at the channel wall.

Figure 2:
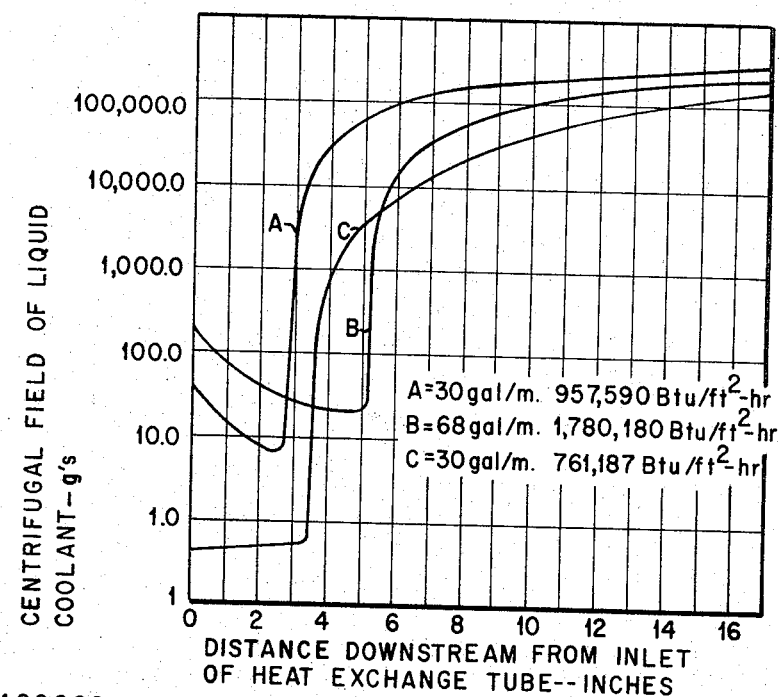
Figure 3:
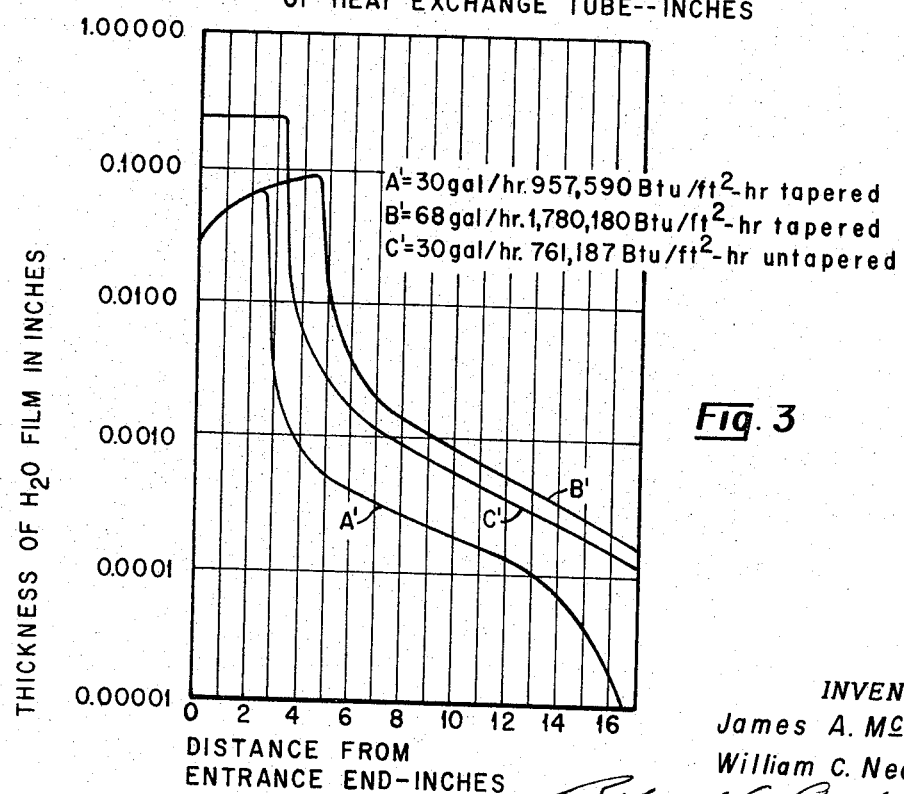

Other objects of the invention will be apparent from an examination of the following description and the appended drawings wherein:

FIG. 1 is a longitudinal cut-away view of a steam generating channel utilizing a central insert in accordance with the present invention;

FIG. 2 is a graph showing the centrifugal field in $g$'s of the liquid coolant for the condition of no slippage between the liquid and gas phases at various axial positions along several test assemblies constructed in accordance with the present invention; and FIG. 3 is a graph showing the thickness of the liquid coolant for the condition of no slippage between the liquid and gas phases at various axial positions along the test assemblies during the test runs illustrated in FIG. 2.

Applicants have independently found that in a steam generating heat exchange tube the steam which is generated can be utilized to provide spinning or vortex flow to the unevaporated water coolant. We have further discovered that, by utilizing the steam to drive the water, very high burnout heat fluxes can be achieved under conditions of nucleate boiling at the tube inner wall, at low pressures and with small pressure drops through the heat exchange tube and with very small amounts of unevaporated water coolant present in the heat exchange tube at any one time. Thus, highly efficient nucleate boiling heat transfer and high heat fluxes have been achieved by applicants without the use of high pumping powers.

In accordance with the invention, apparatus is provided for utilizing the steam generated in a heat exchange tube to drive the unevaporated water contained therein in vortex flow. The apparatus comprises a central core mounted in the heat transfer tube. The central core has an elongated tapered shank portion of circular cross section mounted coaxially in the coolant channel of the tube. A helical rib, having an outside diameter substantially equal to the inside diameter of the coolant tube, is integrally fixed to and encircles the shank portion. The helical rib, shank portion, and inside wall of the heat exchange tube define a spiralling flow path for the steam generated in the heat exchange tube. Due to the large centrifugal fields in the coolant channel, the large volume of steam generated in the channel is forced to travel along the inside of the spiralling flow path closest to the shank portion at high velocities, and in doing so drives the unevaporated water in a spiral or vortex flow against the inside wall of the heat exchange tube. The driving energy for providing vortex flow to the water is in effect provided by a portion of the heat transferred from the heat exchange tube wall, through the generation and expansion of steam which is constrained to follow a spiral flow path in contact with the unevaporated water.

In order to facilitate an understanding of the invention, reference is first made to FIG. 1 of the drawings wherein a heat exchanger made in accordance with the invention is illustrated. A central core comprising a tapered shank portion 1 and a helical rib 2 is disposed coaxially within a heat exchange tube 3. The larger diameter end 4 of shank portion 1 is disposed at the inlet end 5 of heat exchange tube 3, and the smaller diameter end 6 is disposed at exhaust end 7. Helical rib 2, having an outside diameter substantially equal to the inside diameter of heat exchange tube 3, is integrally fixed to and encircles shank portion 1. The helical rib 2, tapered shank portion 1, and inside wall 8 of heat exchange tube 3 define a spiralling flow path 9 whose cross section increases with increasing distance from the inlet end 5 of the heat exchange tube 3.

A relatively small flow channel cross section is provided at the inlet end 5 of heat exchange tube 3 in order to initially force the coolant water into a vortex flow having a sufficiently high rotational velocity to produce a centrifugal acceleration at the wall of the heat exchange tube to prevent burnout at the inlet. A centrifugal acceleration of 10g has been found adequate. As the coolant water advances along spiralling passageway 9, steam is generated at the inner wall 8 of heat exchange tube 3 and forced inwardly away from wall 8 by the centrifugal effect of the spinning flow of higher density coolant water along the wall. The low density steam generated along wall 8 collects along the face of shank 1 where a continuous spiral steam flow path is formed. The steam flow path cross section increases as the steam and water advances through the heat exchanger. The increase in the steam flow path cross section is facilitated by the tapered shank portion 1 and the decreasing volume of water coolant. An increasing steam flow path cross section is necessary to accommodate the increasing volume of steam flow at increasingly downstream portions along the heat exchanger.

The heat exchange tube length and diameter, the taper of shank portion 1, and the pitch of helical rib 2 are selected in view of the contemplated coolant flow rate and heat flux so as to provide for the development of a centrifugal field in the liquid coolant which is adequate to preclude burnout. Preferably, the liquid coolant is present in diminishing quantity up to the exhaust end of the heat exchange tube, at which point virtually all of the coolant has been converted to steam. Where superheated steam is desired, any entrapped moisture is separated from the discharged steam and the dry steam is then passed through separate small diameter heat exchange channels in straight axial flow, where it is superheated. Complete evaporation of the liquid coolant at a point upstream of the heat exchange tube discharge end is generally undesirable as it results in a decrease in heat transfer rate and an increase in wall temperature along the downstream remainder of the heat exchange tube, where boiling is no longer available as a heat transfer mechanism. It is noted, however, that even where the liquid coolant is completely evaporated, continued vortex flow of steam through the remaining heat exchange tube provides some improvement over straight axial flow.

FIG. 2 graphically illustrates experimental results of tests using heat exchange tubes with tapered and untapered central cores similar to the tapered core illustrated in FIG. 1. The untapered core used in the tests differed from the tapered core only in that the shank portion 1 has a uniform diameter in the untapered core, whereas in the tapered core its diameter decreases at increasing distances downstream from the inlet end of the heat exchange tube. The ordinate axis of FIG. 2 represents the centrifugal force in $g$'s experienced by the coolant water for the condition of no slippage between the liquid and gas phases during the tests, and the abscissa represents various distances, in inches, downstream from the inlet end of the heat exchange tube.

Curves A and B of FIG. 2 represent tests using heat exchange tubes with tapered central cores and run at coolant flow rates of 30 and 68 gal./hr. respectively. An untapered central core and a 30 gal./hr. flow rate were used to generate the results shown in curve C. A comparison of curves A and C illustrates the effect of using a tapered shank portion in the central core. The effect of the tapered shank is most important in the first few inches of the coolant channel downstream from its inlet end where a centrifugal field of less than one $g$ is provided by the untapered core of curve C while the tapered core provides a minimum of about seven $g$'s which is one order of magnitude larger than that of curve C. Inasmuch as the vorticity of the spinning flow increases with an increasing gravitational field, the vorticity experienced in the first three inches of the heat exchange tube of curve C is much lower than that of curve A. The lower vorticity of the flow of curve C increases the probability of burnout near the inlet of curve C before the driving action of steam generated in the coolant channel rapidly accelerates the flow, causing it to increase the centrifugal flow in the next few inches downstream by several orders of magnitude. Such rapid acceleration occurs in the space interval from about two and one-half to about six inches downstream from the inlet end of all three heat exchange tubes.

It is apparent from the curves of FIG. 2 that the inlet ends of the heat exchange tube tends to operate with the lowest centrifugal fields in the coolant flow and that the use of a tapered core partially compensates for this effect by providing higher centrifugal fields near the heat exchange tube inlet. The use of various degrees of taper, flow channel cross section between the core insert and heat exchange tube, and various pitches in the helical rib surrounding the central shank portion will be apparent to those skilled in the art as means of varying the centrifugal fields developed at the inlet of the heat exchange tube.

By introducing water at the heat exchange tube inlet end at a temperature close to its boiling point, boiling is initiated almost immediately at the inlet end and steam driven vortex flow develops very close to the inlet. In such a case the design of the tapered core is less critical at the inlet end of the heat exchange tube as the low centrifugal field conditions at which burnout occurs are avoided by the effect of the generated steam in driving the liquid coolant in vortex flow. Such a solution to the inlet burnout problem is not available in those systems where it is impractical to supply liquid coolant to a heat exchange tube at a temperature near its boiling point. The effect of supplying water to a heat exchange tube at a temperature near its boiling point can be appreciated by reference to the curves of FIG. 2. The curves in that figure would be shifted along the abscissa so that the sharp rise in centrifugal field associated with each curve at a point at least several inches downstream from the inlet would occur within the first inch of the heat exchange tube downstream from its inlet.

An alternative solution to the inlet burnout problem is provided in copending patent of common assignee S.N. 565,012, filed July 13, 1966, where prewhirl generators are used to develop sufficient centrifugal fields in the incoming liquid coolant to avoid burnout prior to the generation of steam which sustains and increases the centrifugal field. In that application, double threaded entry screws or tangential slots are provided to induce vorticity to liquid coolant at the inlet of a neutronic fuel element.

A significant and highly beneficial characteristic of systems made in accordance with the present invention is illustrated in FIG. 3 where curves A', B', and C' corresponding respectively to curves A, B, and C of FIG. 2 are plotted. The ordinate axis of FIG. 3 represents the thickness of the water film which rides the inner wall 8 of the heat exchange tube 3 for the condition of no slippage between the gas and liquid phases, and the abscissa represents various distances downstream from the inlet end of the heat exchange tube. As shown in FIG. 3, a very rapid decrease in water film thickness occurs in each heat exchange tube at a point where boiling or steam generation first commences. The water film thickness in curves A' and C' decreases by about two orders of magnitude in about two inches of travel downstream from the point where the water commences to boil. Boiling commences in curve A' at about two and one-half inches downstream from the coolant tube inlet, and in curve C' about three inches downstream. The larger coolant flow in curve B' requires greater downstream travel before a comparable decrease in film thickness occurs.

The very thin liquid coolant films developed in the heat exchange tubes, as shown by the test results of FIG. 3, enable steam generating neutronic reactor cores to be constructed which have only small amounts of coolant present in the core during operation. Small amounts of coolant in the core may be desirable in fast reactors where the presence of large amounts of coolant water having good moderating properties would tend to thermalize the reactor and prevent its operation as a fast reactor.

Small film thicknesses are also desirable where, as here, large centrifugal fields are developed by the coolant. The small film thickness develops relatively small centrifugal forces against the coolant channel wall even at the very high centrifugal fields developed in the above tests as shown in FIG. 2. Where only small centrifugal forces are encountered as a result of the thin coolant films, design requirements for the heat transfer tube, or the internal cladding in the case of a tubular neutronic reactor fuel element, are reduced.

Although the present invention may be generally incorporated in reactors where liquid coolant is vaporized, it is particularly useful in the boiling, recirculating water reactors described in copending applications of common assignees Ser. No. 487,643, filed Sept. 15, 1965, now Patent No. 3,290,221, issued Dec. 6, 1966 and Ser. No. 491,064, filed Sept. 28, 1965, now Patent No. 3,287,228, issued Nov. 22, 1966.

The above description of the invention was offered for illustrative purposes only, and should not be interpreted in a limiting sense. For example, although for simplicity of discussion, water was generally referred to throughout the specification as a suitable liquid coolant, other liquid coolants which may be vaporized through heat addition are also suitable. Such other liquid coolants include, but are not restricted to, liquid metals including mercury, potassium, and rubidium and organic liquids. It is intended rather that the invention be limited only by the claims appended hereto.

What is claimed is:

1. Apparatus for increasing the burnout heat flux in a heat exchange member wherein liquid coolant is passed through a cylindrical passageway in said heat exchange member and vaporized, comprising: an elongated insert disposed coaxially within said coolant channel and extending along the length thereof, said passageway having an inlet end for receiving liquid coolant and an exhaust end for discharging vaporized coolant, said insert comprising a uniformly tapered shank portion having a circular cross section and a helical rib spiralling around said shank portion, the larger diameter end of said shank portion being disposed at the inlet end of said passageway, said helical rib having a radial periphery whose diameter is substantially equal to the diameter of said passageway.

2. The improvement of claim 1 wherein the larger diameter and of said shank portion and the pitch of said helical rib are selected to impart an initial vortex flow to said liquid coolant characterized by a centrifugal field of at least $10g$ in that portion of said passageway where substantially no coolant vaporization takes place, said liquid coolant being maintained in vortex flow along the remainder of said passageway by the driving action of the vaporized coolant as it travels along the spiral path defined by said helical rib and shank portion.

3. The improvement of claim 1 wherein said liquid coolant is introduced to the heat exchange member at a temperature substantially equal to its boiling point.

References Cited

UNITED STATES PATENTS

| | | | |
|---|---|---|---|
| 538,589 | 4/1895 | Kemble | 138—38 |
| 3,063,925 | 11/1962 | Huet | 176—54 |
| 3,071,159 | 1/1963 | Coraggioso | 138—38 |
| 3,086,372 | 4/1963 | Barger et al. | 165—109 X |
| 3,090,742 | 5/1963 | Fawcett | 176—59 X |
| 3,232,341 | 2/1966 | Woodworth | 165—146 X |

FOREIGN PATENTS

| | | |
|---|---|---|
| 801,242 | 9/1958 | Great Britain. |
| 980,412 | 1/1965 | Great Britain. |
| 990,762 | 4/1965 | Great Britain. |
| 265,975 | 8/1929 | Italy. |

ROBERT A. O'LEARY, *Primary Examiner.*

A. W. DAVIS, JR., *Assistant Examiner.*

UNITED STATES PATENT OFFICE
CERTIFICATE OF CORRECTION

Patent No. 3,339,631 September 5, 1967

James A. McGurty et al.

It is hereby certified that error appears in the above numbered patent requiring correction and that the said Letters Patent should read as corrected below.

Column 6, line 16, after "comprising:" insert -- a coolant channel, --.

Signed and sealed this 15th day of October 1968.

(SEAL)
Attest:

Edward M. Fletcher, Jr.
Attesting Officer

EDWARD J. BRENNER
Commissioner of Patents